US005521996A

United States Patent [19]

Ames et al.

[11] Patent Number: 5,521,996
[45] Date of Patent: May 28, 1996

[54] ELECTRICAL AND FIBER-OPTIC CONNECTOR

[75] Inventors: Gregory H. Ames, Gales Ferry; Roger L. Morency, Voluntown, both of Conn.

[73] Assignee: The United States of America as represented by the Secretary of the Navy, Washington, D.C.

[21] Appl. No.: 345,049

[22] Filed: Nov. 25, 1994

[51] Int. Cl.$^6$ ........................................ G02B 6/38
[52] U.S. Cl. ..................... 385/75; 385/53; 385/59; 385/71
[58] Field of Search .................... 385/75, 85, 54, 385/59, 60, 78, 35, 53, 55, 71, 72

[56] References Cited

U.S. PATENT DOCUMENTS

| | | | |
|---|---|---|---|
| 3,917,383 | 11/1975 | Cook et al. | 385/54 |
| 4,027,938 | 6/1977 | Lewis | 385/85 X |
| 4,140,367 | 2/1979 | Makuch et al. | 385/54 X |
| 5,394,493 | 2/1995 | Ames | 385/35 |

Primary Examiner—John D. Lee
Assistant Examiner—Phan T. H. Palmer
Attorney, Agent, or Firm—Michael J. McGowan; Michael F. Oglo; Prithvi C. Lall

[57] ABSTRACT

There is presented a hybrid electrical and fiber-optic connector and a method of making same. The connector comprises a plurality of bodies, the bodies including at least one fiber-optic ferrule having extending centrally therethrough a single optical fiber, and at least one electrical contact having an electrically conductive wire fixed thereto. The connector further includes structure exercising a radially compressive force on the bodies for urging the bodies into a configuration in which said bodies are coparallel and nested so as to form a stable bundle which in transverse section is substantially axisymmetrical, and retaining said bodies in the configuration. The connector still further includes alignment structure for angular positioning of said bodies in said connector in said transverse section about a nominal longitudinal axis of said bundle for registry of the connector with a second connector of complementary configuration.

29 Claims, 9 Drawing Sheets

ELECTRICAL AND FIBER-OPTIC CONNECTOR

STATEMENT OF GOVERNMENT INTEREST

The invention described herein, may be manufactured and used by or for the Government of the United States of America for governmental purposes without the payment of royalties thereon or therefor.

CROSS-REFERENCE TO RELATED PATENT APPLICATIONS

This patent application is co-pending with four related patent applications entitled A Fiber-Optic Connector (Navy Case 75356) filed on even date, Fiber-Optic Collimator Bundle Assembly, Ser. No. 08/287,029, Multi-Channel Fiber-Optic Rotary Joint With Bundle Collimator Assemblies now U.S. Pat. No. 5,394,493, Ser. No. 08/287,027, now U.S. Pat. No. 5,442,027 and Assembly Method For Fiber-Optic Bundle Collimator Assemblies, Ser. No. 08/287,028, and having a filing date of 8 Aug. 1994 now U.S. Pat. No. 5,400,429.

BACKGROUND OF THE INVENTION (1) Field of the Invention

The invention relates to hybrid electrical and fiber-optic connectors, and is directed more particularly to a connector having therein a plurality of bodies, the bodies including at least one fiber-optic ferrule, and at least one electrical connector ferrule, among at least three bodies, and to a method for making same.

(2) Description of the Prior Art

Single channel fiber-optic connectors are well known. Precision ceramic ferrules, as shown in FIGS. 1 and 2 herein, each have a central lengthwise-extending tube adapted to hold a single optical fiber and are made with high precision. The ferrules are inexpensive and are manufactured in large quantity. The concentricity of the central tube, the diameter thereof, and the diameter of the ferrules are extremely consistent, permitting precision alignment of ferrules, and thereby the optical fibers occupying the tubes therein. A split cylindrical sleeve as shown in FIGS. 3 and 4, is commonly used to align two ferrules. Because of the precision with which the ferrules are manufactured, alignment of the ferrules simultaneously accomplishes alignment of the optical fibers. In practice, the offset of the end-to-end abutting of the optical fibers laterally, that is, in directions perpendicular to the axes of fibers, is but a few microns. To insure that the alignment of ferrules is not hindered, the two ferrules customarily float, relative to an outer connector shell, on springs (not shown).

In multi-channel connectors, virtually the same construction is used. A plurality of single fiber ferrules float independently on springs and are individually aligned and connected with matching ferrules of another connector by independent sleeves. The result is a rather large connector joint, inasmuch as the individually floating ferrules cannot be closely packed. Further, the joining of connectors is a laborious process in which each pair of optical fibers is connected together, pair by pair.

There is thus a need for a connector adapted to simultaneously connect multiple optical fibers with low loss and high reliability, that is, with extreme precision, which connector is of a miniature size.

There are also many applications in which a hybrid connection must be made including both optical transmission fibers and electrical transmission wires. Often control and data signals are carried on the optical fibers and power is provided by way of the electrical wires. In such connectors, not only must the optical fibers be in precision engagement to avoid loss of light, but the electrical contacts must also be accurately aligned and abutted to avoid loss of current continuity and/or arcing. Most hybrid cables are connected by breaking the cables out into separate electrical and fiber-optic connectors.

Accordingly, the aforementioned need for a small sized fiber-optic connector having facility for simultaneous connection of multiple optical fibers with extreme precision pertains still further to a hybrid connector, small in size, and having facility for simultaneously connecting together a plurality of optical and electrical transmission lines including a combination of optical fibers and electrically conductive wires.

SUMMARY OF THE INVENTION

An object of the invention is, therefore, to provide a hybrid fiber-optic and electrical connector having a plurality of ferrules closely packed and accurately positioned for alignment with a second connector of complementary configuration.

With the above and other objects in view, as will hereafter appear, a feature of the present invention is the provision of a hybrid electrical and fiber-optic connector comprising a plurality of bodies of substantially cylindrical configuration and of equal diameter, the plurality of bodies including at least one fiber-optic ferrule having extending centrally therethrough a single optical fiber, and at least one electrical contact having fixed thereto an electrically conductive wire. The connector further comprises means abutting all peripheral of the bodies for exercising a radially compressive force on the bodies for urging the bodies into a configuration in which the cylindrical bodies are coparallel and nested such that the bodies form a stable bundle which in transverse section is axisymmetric, and retaining the bodies in such configuration. The connector further includes azimuthal alignment structure for alignment of the connector with a second connector of complementary configuration.

In accordance with a further feature of the invention, there is provided a hybrid electrical and fiber-optic connector assembly comprising a first connector having a plurality of bodies of substantially cylindrical configuration and of equal diameter, the plurality of bodies including at least one fiber-optic ferrule having extending centrally therethrough a single optical fiber, and at least one electrical contact having fixed thereto an electrically conductive wire. The connector assembly further comprises means abutting all peripheral ones of the bodies for exercising a radially compressive force on the bodies for urging the bodies into a configuration in which the cylindrical bodies are coparallel and nested Such that the bodies form a stable bundle which in transverse section is axisymmetric, and retaining the bodies in such configuration. The connector assembly further comprises azimuthal alignment structure for alignment of the connector with a second connector of complementary configuration, and an alignment sleeve adapted to receive and retain the first and second connectors in alignment and in abutting relationship.

In accordance with a further feature of the invention, there is provided a method for making a hybrid electrical and fiber-optic connector, the method comprising the steps of positioning a plurality of bodies of substantially cylindrical configuration and of equal diameter side by side, said plurality of bodies including at least one fiber-optic ferrule having extending centrally therethrough a single optical fiber tube, and at least one electrical contact adapted to have fixed thereto an electrically conductive wire, surrounding the bodies with a sleeve member operative to engage all peripheral ones of the bodies and to exercise a radially compressive force on the bodies to urge the bodies into a configuration in which the cylindrical bodies are coparallel and nested such that the bodies form a stable bundle which in transverse section is axisymmetric. The bodies are then locked in position in the stable axisymmetric configuration. An azimuthal alignment structure is affixed to the connector to facilitate alignment of the connector with a second connector of complementary configuration. The method includes the further steps of inserting an optical fiber in each of the ferrule tubes, fixing the optical fibers in the tubes, removing portions of the fibers extending from face portions of the ferrules, and polishing the ferrule face portions for precision abutment with complementary faces of ferrules of a second connector.

The above and other features of the invention, including various novel details of construction and combinations of parts, will now be more particularly described with reference to the accompanying drawings and pointed out in the claims. It will be understood that the particular devices and methods embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 5:
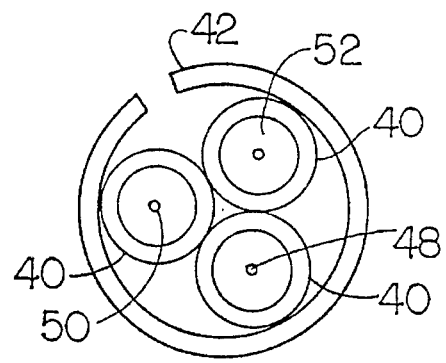
FIG. 5 is an end view of a multi-channel connector illustrative of an embodiment of the invention.
Figure 6:
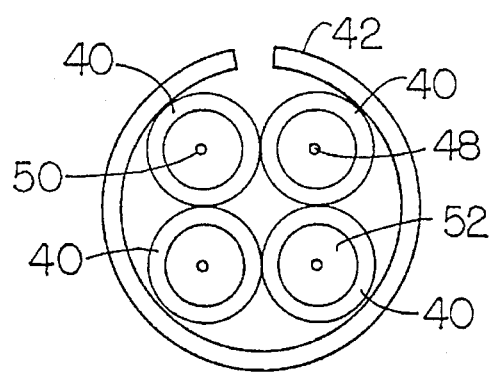
FIGS. 6–10 are end views of alternative embodiments of the invention.
Figure 8:
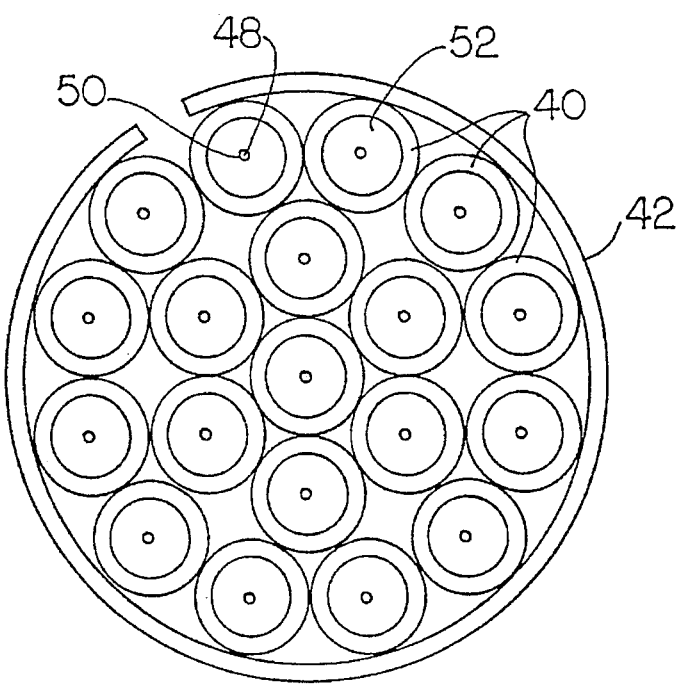
Figure 7:
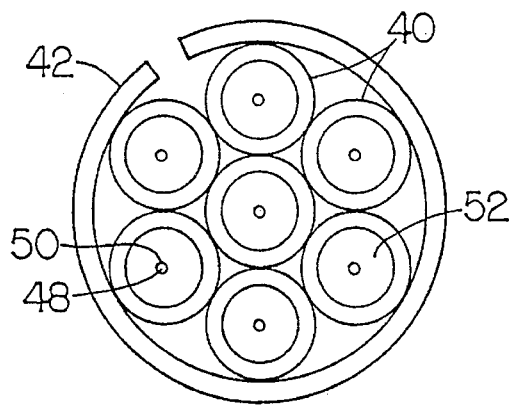

Referring to FIG. 5, it will be seen that a fiber-optic connector, of the type shown and described in co-pending patent application U.S. Ser. No. 08/345,957 filed Nov. 25, 1994 includes a plurality of known single channel ferrules 40. The plurality of ferrules 40 are formed into a compact assembly by squeezing a group of side-by-side single-channel ferrules together with an inwardly directed radial force applied from all directions around the group of ferrules. The ferrules 40 are thereby caused to align themselves into a predictable configuration in which the cylindrical bodies are coparallel and nested such that the bodies form a stable bundle which in transverse section is axisymmetric. In FIG. 5, three ferrules are shown compressed together in such a stable, axisymmetric configuration. FIGS. 6, 7 and 8 show embodiments having, respectively, four, seven and nineteen single-channel ferrules. In each instance, the configuration of ferrules is predictable and the ferrules are nested such that the bodies form a stable, axisymmetric bundle.

Figure 9:
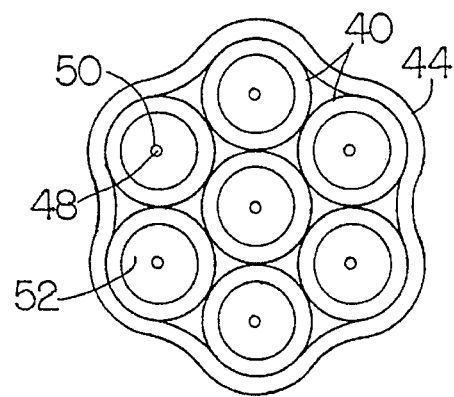

The radially compressive force required to squeeze ferrules 40 into a close-packed configuration may be provided by a split-sleeve 42 acting as a leaf-spring engaging all peripheral ones of the ferrules and urging the ferrules inwardly, or a shrink-film band 44 (FIG. 9), or elastomeric bands (not shown), or the like.

Figure 10:
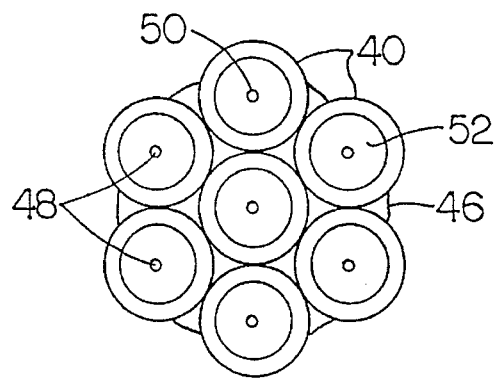
Figure 11:
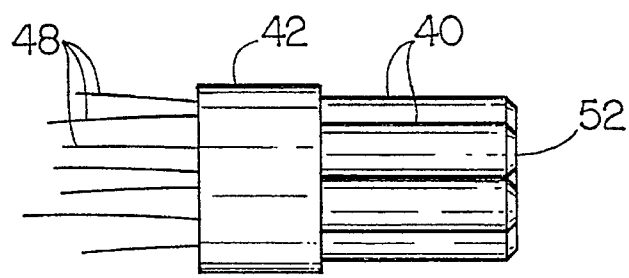
FIG. 11 is a side elevational view of the connector of FIG. 7.

Once the ferrules 40 are squeezed into position, the ferrules are held together by a retaining means, which may be the split-sleeve 42 (FIG. 7), shrink-film band 44 (FIG. 9), or other means used to apply inwardly-directed pressure on the ferrules. Either in conjunction with the squeezing means 42, 44, or independently thereof, a potting material, such as an epoxy 46 (FIG. 10), may be used to lock the ferrules 40 together and in place. The potting material 46 may be injected into the interstices between ferrules 40 such that the assembly of ferrules becomes one solid assembly. As shown in FIG. 10, if potting material 46 is relied upon as a sole ferrule retaining means, the radially compressive force means may be removed. If sleeve 42 is kept in place to serve as ferrule retention means, the sleeve is positioned around the rear-most portions of the ferrules (FIG. 11), leaving the forward-most portions free for passage into an alignment sleeve, to be discussed hereinafter.

While the inwardly-directed compressive force causes the ferrules to form a stable bundle, such compressive force is not always sufficient to preclude twisting of the ferrules about the center of the bundle. Twist results in output beams that twist in space. In aforementioned U.S. patent application Ser. No. 08/287,028 U.S. Pat. No. 5,400,429, there is shown and described a method for assembling a group of ferrules in such manner as to avoid the possibility of twisting of the ferrules.

After the plurality of ferrules is assembled and bound together, it is loaded with optical fibers 48, which are potted in their respective tubes 50. After hardening of the potting material 46, the fibers 48 are cleaved off at ferrule faces 52, which are then polished. In view of the high accuracy of the diameters of ferrules 40, when fibers 48 are inserted into ferrules 40, potted and polished, the connector face has fibers 48 positioned in a highly accurate array.

Figure 1:
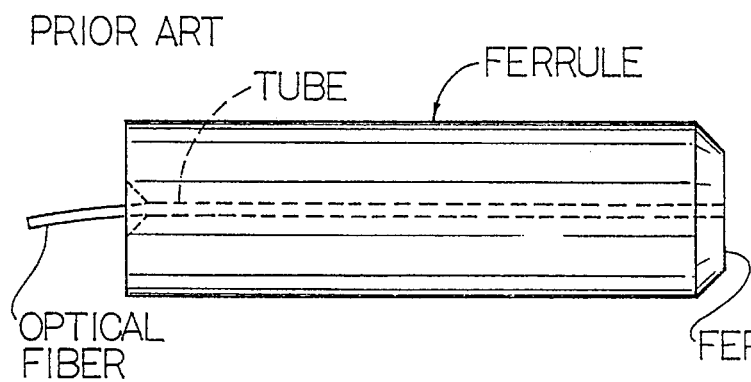
FIG. 1 is a side elevational view of a prior art single-channel fiber-optic ferrule.
Figure 2:
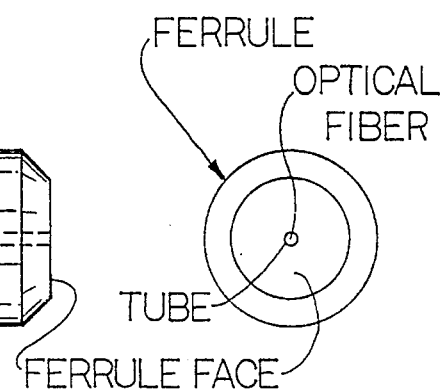
FIG. 2 is an end view of the ferrule of FIG. 1.
Figure 3:
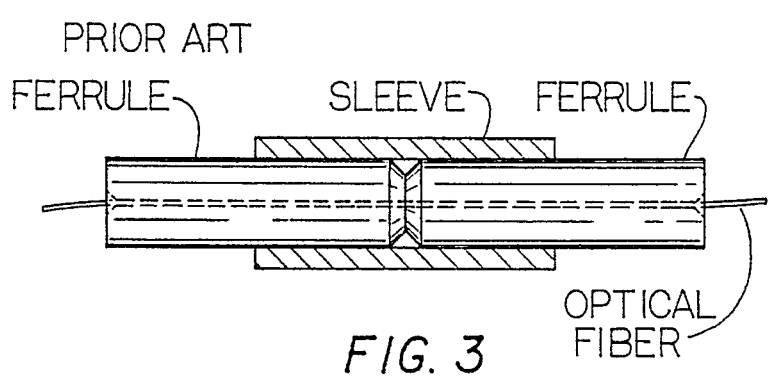
FIG. 3 is a partly side elevational, partly sectional view of two of the prior art ferrules of FIG. 1 held together by a prior art sleeve.
Figure 4:
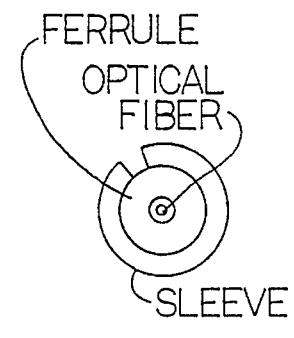
FIG. 4 is an end view of the ferrule and sleeve assembly of FIG. 3.
Figure 12:
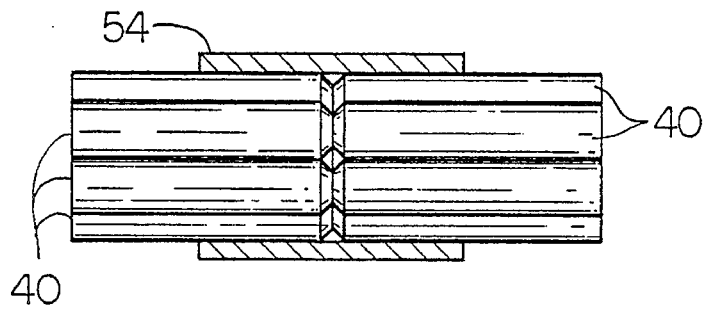
FIG. 12 is a side elevational view illustrating a connector assembly including connectors of the type shown in FIG. 11 held together by a sleeve.

Two such connectors are adapted to have optical fibers 48 in matching positions. The connectors are aligned by an alignment sleeve 54 (FIG. 12). However, while a simple alignment sleeve is sufficient in single-channel connectors (FIG. 3), it is lacking in the case of the multi-channel connectors disclosed herein. An alignment sleeve of the type used in single-channel connectors establishes longitudinal and lateral alignment of ferrules, but does not provide for the necessary azimuthal alignment, or "clocking" of the ferrules.

Figure 13:
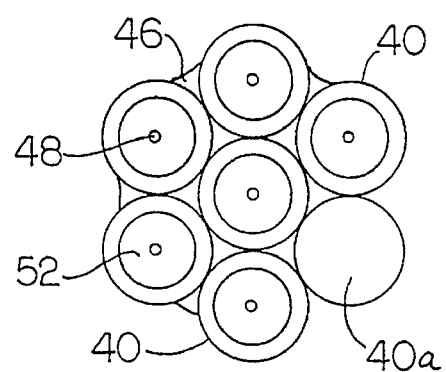
FIGS. 13 and 14 are end views of connectors, illustrating an alignment structure in the connectors.
Figure 14:
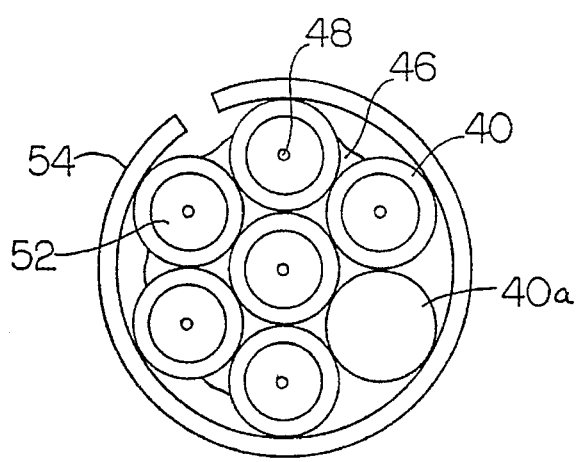
Figure 15:
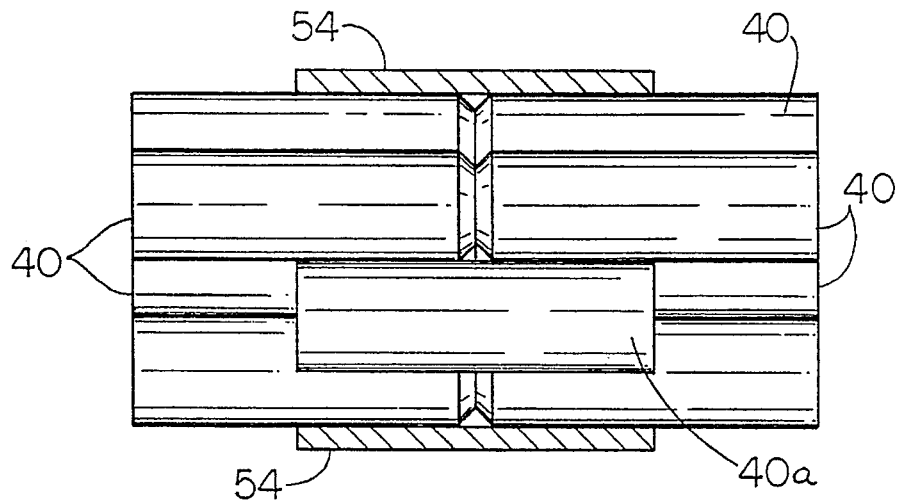
FIG. 15 is a side elevational view of a connector assembly including two connectors of the type shown in FIG. 14 held together by a sleeve.

The invention herein includes provision of azimuthal alignment structure. In FIG. 13 there is shown a bundle of ferrules 40 of the type shown in FIG. 9, but wherein the bundle is formed missing one ferrule from a normal pattern. When two connectors of the type shown in FIG. 13 are inserted into a split cylindrical alignment sleeve 54, a standard ferrule 40a without an optical fiber therein, is inserted into the position of the missing ferrule, such that about half its length is adapted to be received by a second connector (FIG. 15). The "blank" ferrule 40a thus serves as a precision pin, bringing the two connectors into azimuthal alignment.

Figure 16:
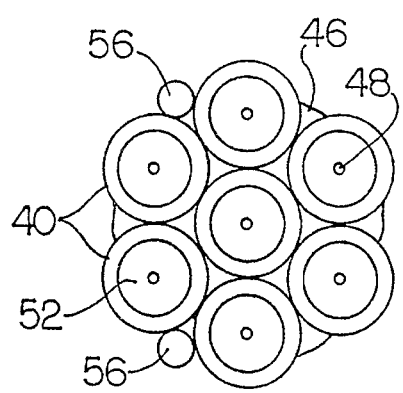
FIGS. 16–19 are illustrative of alternative embodiments of alignment structure.
Figure 17:
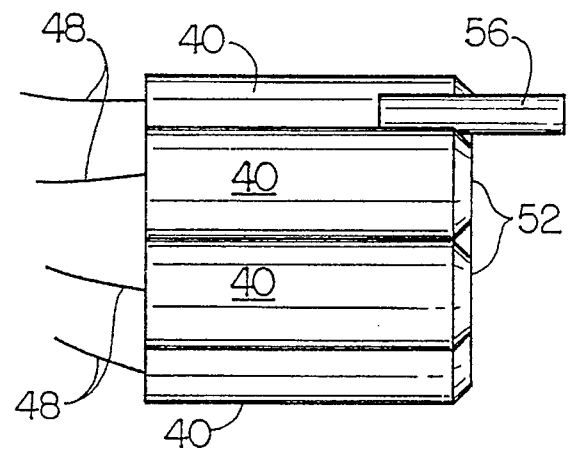
Figure 18:
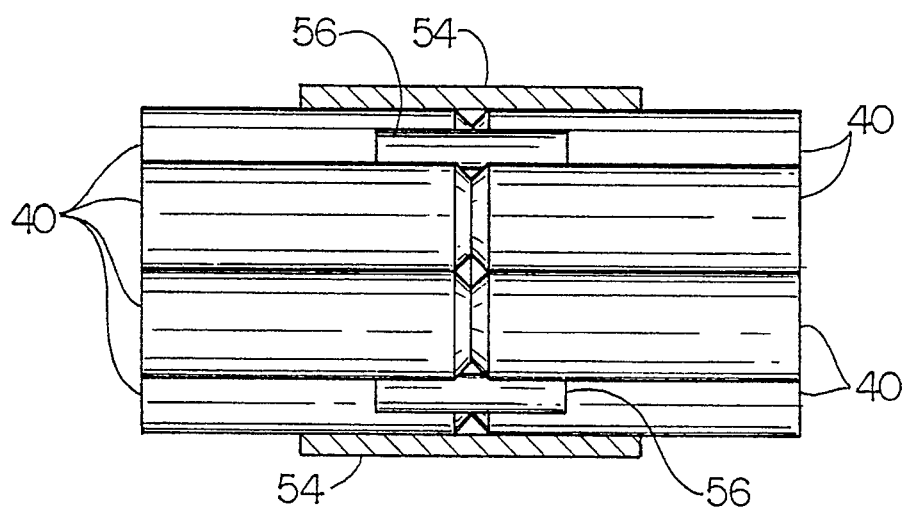

Alternatively, all ferrules may be retained as active ferrules and the necessary azimuthal alignment may be obtained by use of one or more precision rods 56 (FIG. 16), which protrude from the face of one connector (FIG. 17) and are adapted to be received in a matching recess in a mating connector (FIG. 18). When the connectors are inserted into alignment sleeve 54, rods 56 enter the matching recesses and the required azimuthal alignment is achieved.

Figure 19:
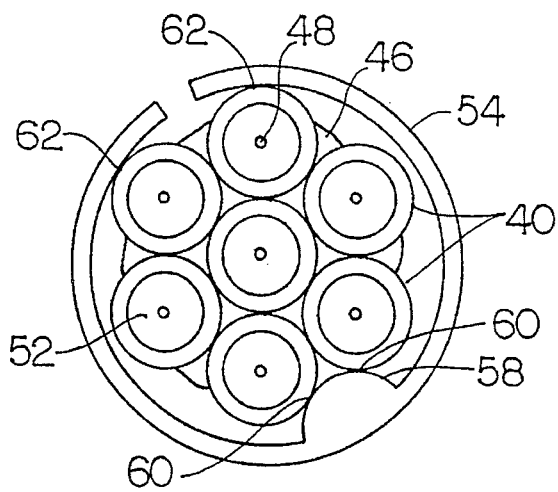

Another alternative embodiment of azimuthal alignment means is shown in FIG. 19. In this embodiment, alignment sleeve 54 is provided with a key 58 for providing a unique azimuthal alignment of ferrules. In the embodiment shown in FIG. 19, cylindrical split alignment sleeve 54 is provided with semi-cylindrical key 58 formed on the interior of the sleeve, preferably opposite to the split in the sleeve. The diameter of key 58 preferably is close to, but greater than, the diameter of ferrules 40. When a bundle of ferrules is inserted into alignment sleeve 54, key 58 aligns with one of the outer interstices between ferrules 40, in such a manner as to form a two point contact 60 with the ferrules. The remainder of the alignment sleeve 54 will have two additional contact points 62 with the ferrules. The four contact points 60, 62 are sufficient to laterally interlock and align the two connectors, as well-as provide for fine azimuthal alignment.

Figure 20:
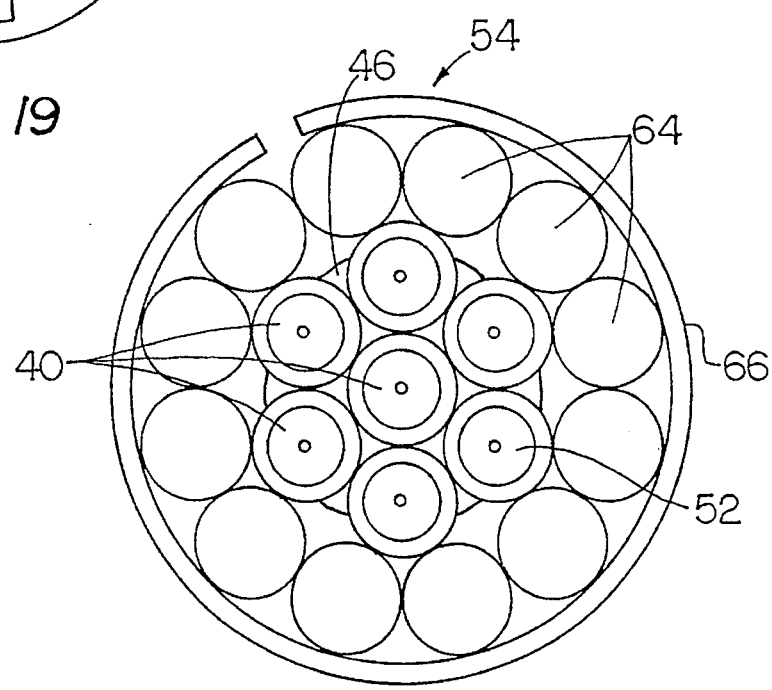
FIG. 20 is an end view of an alternative embodiment of alignment sleeve.
Figure 21:
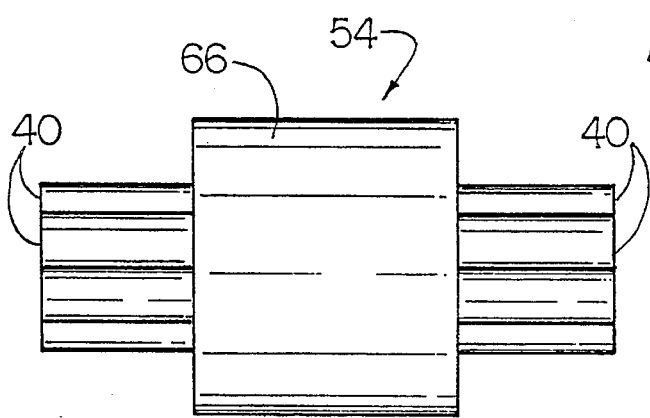
FIG. 21 is a side elevational view of a connector assembly having two connectors of the type shown in FIG. 12 joined to each other by the alternative embodiment of alignment sleeve shown in FIG. 20.

In FIG. 20, there is shown still another alternative embodiment of azimuthal alignment means. In this instance, the alignment sleeve 54 comprises a ring of ferrule-like rods 64 radially compressed by a radial spring element 66. The diameter of the rods 64 precisely matches the diameter of the ferrules 40. The number of rods 64 in the ring, twelve shown in FIG. 20, allows for the insertion of a seven ferrule bundle. When two connectors of the type shown in FIG. 20 are inserted into alignment sleeve 54 (FIG. 21), both lateral and fine azimuthal alignment is established.

All of the optical fiber faces must lie in a predictable plane so that when two connectors are abutted in an alignment sleeve the two connector faces come flush together with minimal gaps. Otherwise, some of the fibers will be separated from their mating fibers by a small gap. It is known that a typical single-mode fiber will experience approximately 0.1 dB loss for a gap between fiber faces of 20 microns. The predictable polished plane may be perpendicular to the axis of the ferrules or, alternatively, at some small angle from perpendicular in order to reduce optical back-reflection from the optical fiber-air interface. When the empty ferrules are formed into a bundle, it is preferable to align the ferrules such that their faces align close to the final polish plane, to minimize material which must be removed during the polish procedure.

Figure 22:
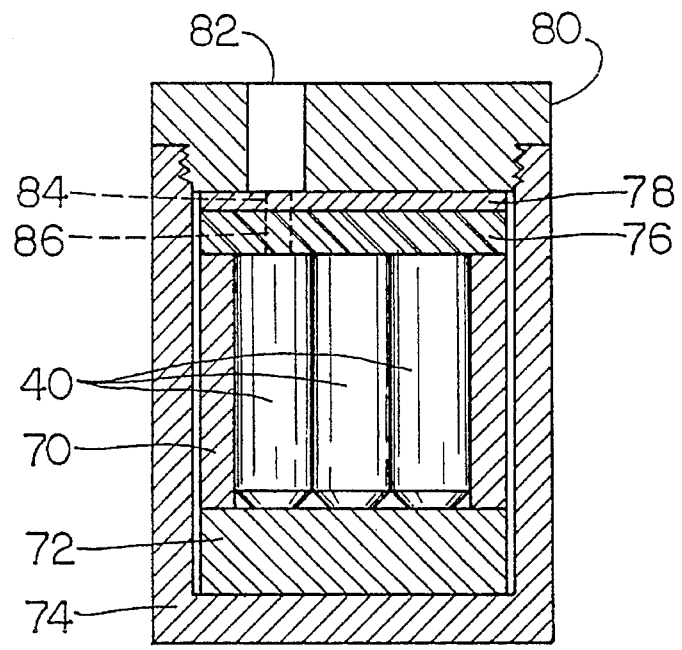
FIGS. 22–25 illustrate method steps in the manufacture of the connector.

One embodiment of equipment to accomplish the alignment task is shown in FIG. 22. The ferrules 40 are held together by radial compressive member 70. The ferrules are then abutted against a reference plate 72 held in an alignment fixture 74. A resilient gasket 76 which may be rubber, or similar material, is inserted on top of the ferrules, followed by a metallic plate 78. The entire stack inside the fixture 74 is compressed by a cap 80 which is threaded into the fixture 74. The compression forces the ferrules 40 against the reference plate 72 and holds them there until they can be immobilized as a unit. In the embodiment shown, this is accomplished by injecting epoxy into a hole 82 in the cap 80 and through holes 84, 86 in the plate 78 and gasket 76, respectively. The holes in plate 78 and gasket 76 can be configured to control which interstices between ferrules the epoxy can be injected into. Thus, it is possible to inject some interstices and not others.

Figure 23:
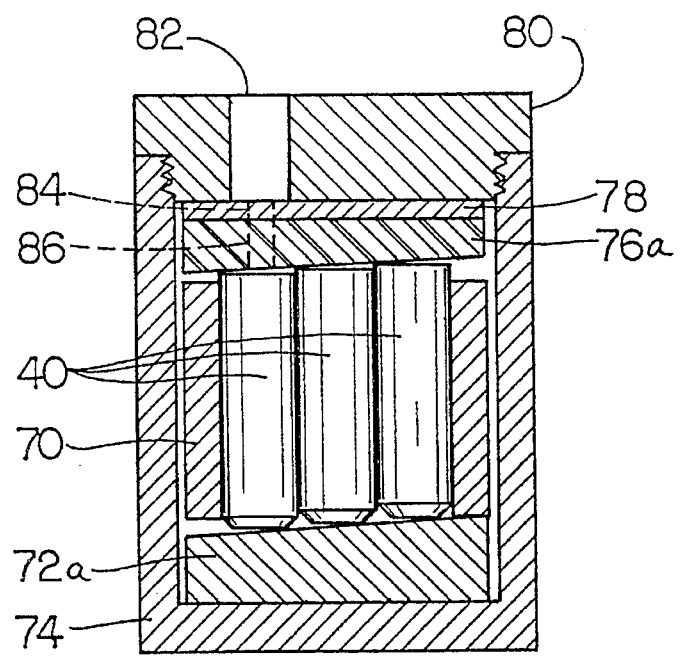

FIG. 23 illustrates a fixture 74 to form connectors with an angled face. An angled reference plate 72a is used in conjunction with an angled gasket 76a. Such serve to force the ferrules against the reference plate in such a way as to form an angled face on the connector.

Figure 24:
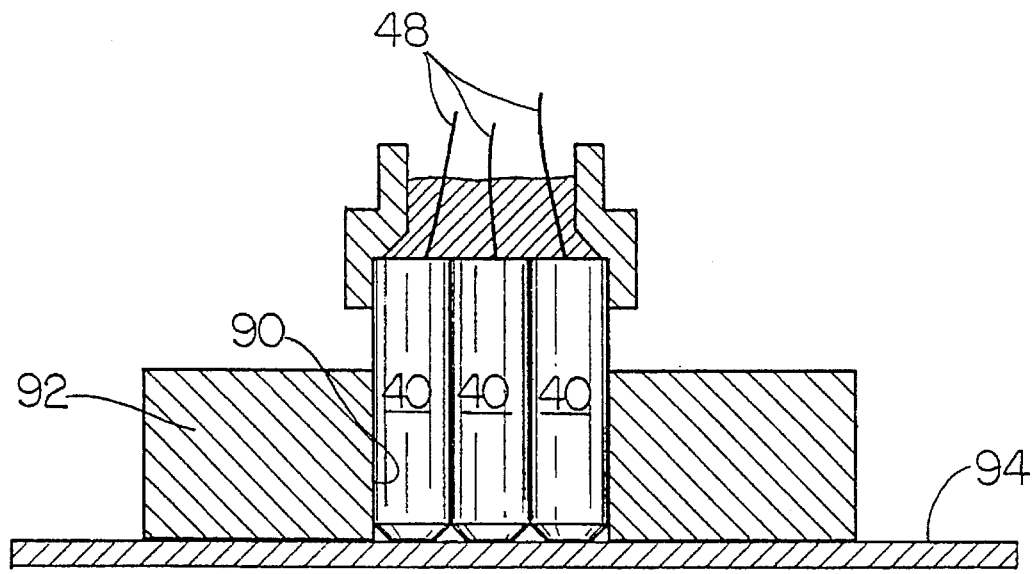

The accuracy of the connector face angle must be maintained during polishing after the optical fibers have been epoxied into the connector. FIG. 24 shows a typical ferrule assembly for a flat polish with optical fibers 48 epoxied in place. To polish the ferrule faces, the ferrule bundle is inserted into a tight-fitting round hole 90 in polish fixture 92. The hole 90 is perpendicular to a surface 94 of the polish fixture 92.

Figure 25:
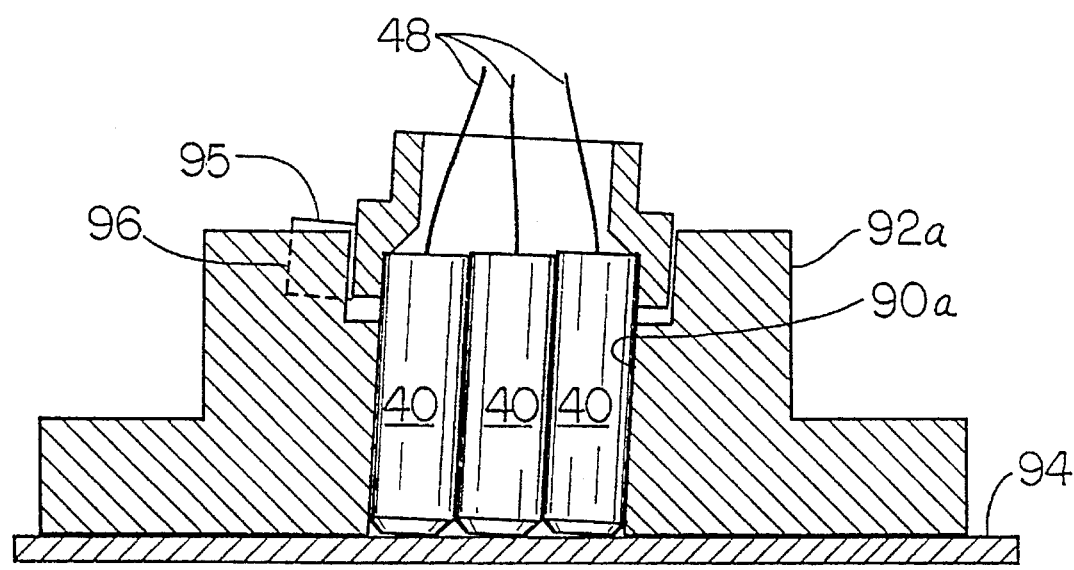

FIG. 25 shows a polish fixture 92a suitable for angled polished ferrules. The ferrules 40 are inserted into a close fitting non-round hole 90a in polish fixture 92a. The shape of the hole 90a depends upon the configuration of the connector and serves to provide azimuthal keying. For example, in a hexagonal seven channel ferrule bundle the hole 90a is hexagonal. The hole 90a is formed in polish fixture 92a with the axis of the hole 90a at a predetermined angle to the surface 94 of the polish fixture. A rough key 95, which is part of the ferrule assembly, must be aligned to fit within a slot 96 in the polish fixture 92a. This selects the proper one of the multiple symmetrical positions in which the connector may be inserted into the polish fixture.

Figure 26:
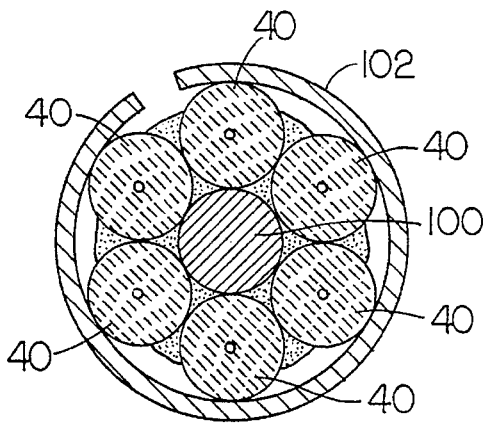
FIG. 26 is an end view of a connector, with a sleeve portion shown in section, illustrative of an embodiment of the invention.
Figure 27:
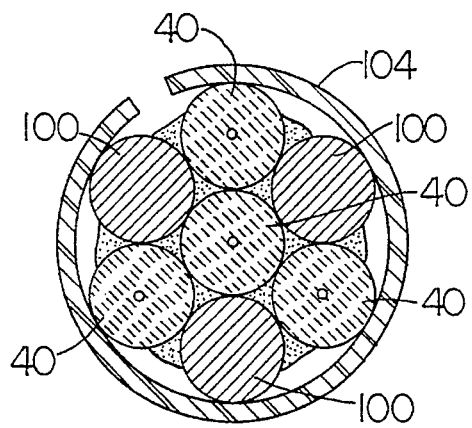
FIG. 27 is similar to FIG. 26, but shows an alternative arrangement of cylindrical bodies.

In FIGS. 26 and 27, fiber-optic ferrules 40 are distinguished from electrical contacts 100. In FIG. 26, there is illustrated a bundle of six fiber-optic ferrules 40 and one electrical contact 100. A metal split sleeve 102 may be utilized and is spaced from contact 100. In FIG. 27, there is illustrated a bundle of four fiber-optic ferrules 40 and three electrical contacts 100. Electrical contacts 100 are necessarily on the outer perimeter of the cluster and a sleeve 104 is of a non-electrically conductive material.

As noted above, the electrical contacts 100 are machined to a precise diameter, subject to the same demanding tolerance required of the fiber-optic ferrules 40.

Figure 28:
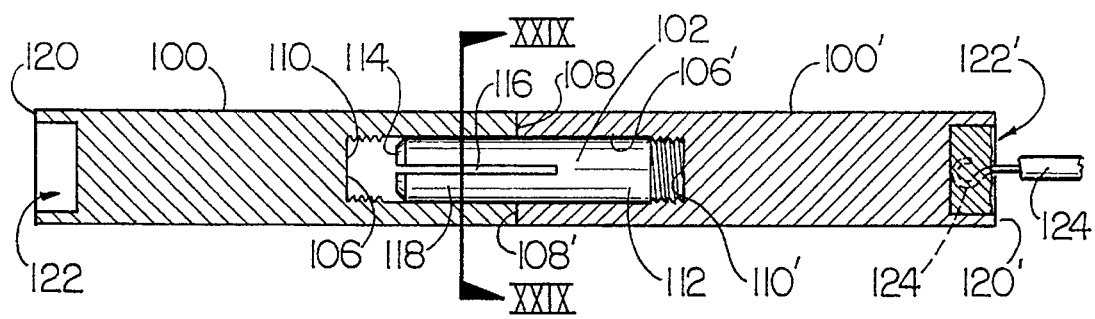
FIG. 28 is a sectional view of two abutting electrical contacts, with a contact pin shown in side elevation.
Figure 29:
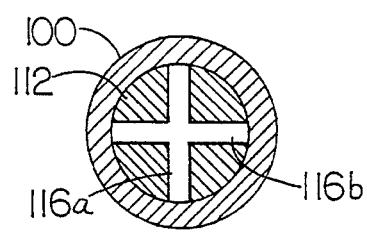
FIG. 29 is a sectional view, taken along line XXIX—XXIX of FIG. 28.

In FIG. 28, there are shown in section opposed electrical contacts 100, 100' of opposed first and second connectors. Each contact is provided with a recess 106, 106' drilled in the contact face 108, 108' with the bottom 110, 110' of each recess 106, 106' threaded. A contact pin 112 is threaded into one of the contacts 100'. A free end 114 of pin 112 is provided with slits 116 to form a spring section 118. As contact pin 112 is inserted into the opposite contact 100, the spring section 118 is compressed, ensuring good electrical contact. The rear portions 120, 120' of the contacts preferably are provided with solder pockets 122, 122' to receive electrical wires 124 to be attached. The contact pin spring section slits 116 include two slits 116a, 116b normal to each other and extending lengthwise of the contact pin.

There is thus provided a hybrid connector and connector assembly for optical fibers and for electrically conductive wires, which connector is superior to separate fiber-optic and electrical connectors, achieves reduced size, and great flexibility in the number of channels connected and in the mix of electrical and fiber-optic channels. There is further provided a relatively inexpensive method for manufacturing such connectors, which method requires relatively short time expenditure.

It is to be understood that the present invention is by no means limited to the particular constructions herein disclosed and/or shown in the drawings, but also comprises any modifications or equivalents within the scope of the claims.

What is claimed is:

1. A hybrid electrical and fiber-optic connector comprising:
   a plurality of bodies of substantially cylindrical configuration and of equal diameter, said plurality of bodies including at least one fiber-optic ferrule having extending centrally therethrough a single optical fiber, and at least one electrical contact having fixed thereto an electrically conductive wire;
   means abutting all peripheral ones of said plurality of bodies for exercising a radially compressive force on said plurality of bodies for urging said plurality of bodies into a configuration in which said plurality of bodies are coparallel and nested so as to form a stable bundle which in transverse section is substantially axisymmetrical, and retaining said plurality of bodies in said configuration; and
   alignment structure for angular positioning of said plurality of bodies in said connector in said transverse section about a nominal longitudinal axis of said bundle for registry with a second connector of complementary configuration in a transverse plane.

2. The connector in accordance with claim 1, wherein said means for exercising a radially compressive force on said plurality of bodies and for retaining said plurality of bodies in said configuration comprises a sleeve disposed around and abutting said peripheral bodies.

3. The connector in accordance with claim 2, wherein said sleeve comprises a split-sleeve leaf spring exercising said radially compressive force on said plurality of bodies.

4. The connector in accordance with claim 2, wherein said sleeve comprises a shrink film sleeve exercising said radially compressive force on said plurality of bodies.

5. The connector in accordance with claim 2, wherein said means for retaining said plurality of bodies in said configuration further comprises a potting material for immobilizing at least a portion of said plurality of bodies.

6. The connector in accordance with claim 1, wherein said plurality of bodies comprises at least three bodies.

7. A hybrid electrical and fiber-optic connector assembly comprising:
   A first connector having a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto an electrically conductive wire;
   means abutting all peripheral ones of said plurality of bodies for exercising a radially compressive-force on said plurality of bodies for urging said plurality of bodies into a configuration in which said plurality of bodies are coparallel and nested so as to form a stable bundle which in transverse section is substantially axisymmetrical, and retaining said plurality of bodies in said configuration;
   alignment structure for angular positioning of said plurality of bodies in said first connector in said transverse section about a nominal longitudinal axis of said bundle for registry of said first connector with a second connector of complementary configuration in a second transverse plane; and
   an alignment sleeve adapted to receive and retain said first connector and said second connector in axial alignment and in abutting relationship.

8. The connector assembly in accordance with claim 7 wherein:
   said alignment structure comprises a positioning ferrule of the same configuration and size as any of said plurality of bodies;
   said positioning ferrule extending from said first connector for engagement with a recess in said second connector, said recess in said second connector being of the same configuration and size as one of said plurality of bodies;
   said recess being adapted to receive said positioning ferrule in said second connector; and
   said positioning ferrule being disposed in said alignment sleeve when said first connector and said second connector are joined.

9. The connector assembly in accordance with claim 7, wherein:
   said alignment structure comprises precision rod means fixed to one of said first connector and said second connector and recess means in the other of said first connector and said second connector; and
   said recess means being adapted to receive said rod means, such that when said first connector and said second connector are joined in said alignment sleeve, said rod means extends from one of said first connector and said second connector into the other of said first connector and said second connector.

10. The connector assembly in accordance with claim 7, wherein said alignment structure comprises a key extending radially inwardly from an inside wall of said alignment sleeve to engage said plurality of bodies at two contact points, interlocking said plurality of bodies into a selected angular attitude in said transverse section.

11. The connector assembly in accordance with claim 10, wherein said plurality of bodies engages said inside wall of said alignment sleeve at two further contact points.

12. The connector assembly in accordance with claim 7, wherein:
   said azimuthal alignment structure comprises a ring of ferrule-like rods fixed to the inside wall of said alignment sleeve and abutting each other side-by-side; and
   said rods defining a central area in said alignment sleeve adapted to receive said first and second connectors having a selected number of said bodies disposed at a selected angular attitude in said transverse section.

13. A hybrid electrical and fiber-optic connector assembly comprising:
   a first connector having a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto on an electrically conductive wire;
   a sleeve surrounding said bodies, abutting all peripheral ones of said plurality of bodies for exercising a radially compressive force on said plurality of bodies for urging said plurality of bodies into a configuration in which said plurality of bodies are coparallel and nested so as to form a stable bundle which in transverse section is substantially axisymmetrical, said sleeve retaining said plurality of bodies in said configuration;
   alignment structure for angular positioning of said plurality of bodies in said first connector in said transverse section about a nominal longitudinal axis of said bundle for registry of said first connector with a second connector of complementary configuration; and
   an alignment sleeve adapted to receive and retain said first connector and said second connector in axial alignment and in abutting relationship.

14. The connector assembly in accordance with claim 13, wherein said alignment structure comprises a projection extending from said first connector and a complementary recess in said second connector for receiving said projection.

15. A hybrid electrical and fiber-optic connector comprising:
   a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto an electrically conductive wire;
   means for engaging all peripheral ones of said plurality of bodies for exercising a radially compressive force on said plurality of bodies for urging said plurality of bodies into a configuration in which said plurality of bodies are coparallel and nested so as to form a stable bundle which in transverse section is substantially axisymmetrical;
   means for retaining said plurality of bodies in said configuration; and
   alignment structure for angular positioning of said plurality of bodies in said connector in said transverse section about a nominal longitudinal axis of said bundle for registry of said connector with a second connector of complementary configuration through a transverse plane thereof.

16. The connector in accordance with claim 15, wherein said means for exercising a radially compressive force and said means for retaining said bodies in said configuration are one-in-the-same, which one-in-the-same means comprises a sleeve abutting said peripheral bodies.

17. A hybrid electrical and fiber-optic connector assembly comprising:
   A first connector having a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto an electrically conductive wire;
   a sleeve surrounding said bodies and abutting all peripheral ones of said bodies for exercising a radially compressive force on said plurality of bodies for urging said plurality of bodies into a configuration in which said plurality of bodies are coparallel and nested so as to form a stable bundle which in transverse section is substantially axisymmetrical;
   means for retaining said plurality of bodies in said configuration;
   alignment structure for angular positioning of said plurality of bodies in said connector in said transverse section about a nominal longitudinal axis of said bundle for registry of said first connector with a second connector of complementary configuration; and
   an alignment sleeve adapted to receive and retain said first connector and said second connector in axial alignment and in abutting relationship.

18. A hybrid electrical and fiber-optic connector comprising:
   a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto an electrically conductive wire;
   said bodies being compacted together by means bearing against all peripheral ones of said plurality of bodies into a configuration in which said plurality of bodies are coparallel and nested so as to form a stable bundle which in transverse section is substantially axisymmetrical;
   means for retaining said ferrules in said configuration; and
   alignment structure for angular positioning of said plurality of bodies in said connector in said transverse section about a nominal longitudinal axis of said bundle for registry of said connector with a second connector.

19. The connector in accordance with claim 18, wherein said plurality of bodies includes at least three bodies, and said bodies are of equal diameter.

20. The connector in accordance with claim 19, wherein said means for retaining said plurality of bodies comprises sleeve means.

21. The connector in accordance with claim 19, wherein said means for retaining said plurality of bodies comprises potting material binding said plurality of bodies together.

22. A hybrid electrical and fiber-optic connector assembly comprising:
   a first connector having a plurality of bodies of substantially cylindrical configuration and of equal diameter, said plurality of bodies including (i) at least one fiber-optic ferrule having extending centrally therethrough a single optical fiber, and (ii) at least one electrical contact having fixed thereto an electrically conductive wire;

peripheral ones of said bodies being engaged by and compacted together by a compressive force means into a configuration in which said plurality of bodies are coparallel and nested so as to form a stable bundle which in transverse section is substantially axisymmetrical;

means for retaining said ferrules in said configuration;

alignment structure for angular positioning of said plurality of bodies in said connector in said transverse section about a nominal longitudinal axis of said bundle for azimuthal registry of said connector with corresponding bodies in a second connector of like configuration; and an alignment sleeve adapted to receive and retain said first connector and said second connector in axial alignment and in abutting relationship.

23. A hybrid electrical and fiber-optic connector assembly comprising:

a first connector having a plurality of bodies of substantially cylindrical configuration and of equal diameter, said plurality of bodies including at least one fiber-optic ferrule having extending centrally therethrough a single optical fiber, and at least one electrical contact having fixed thereto an electrically conductive wire;

peripheral ones of said bodies being engaged by and compacted together by a compressive member into a configuration in which said plurality of bodies are coparallel and nested so as to form a stable bundle which in transverse section is 9f substantially axisymmetrical configuration;

means for retaining said plurality of bodies in said configuration;

at least one of said electrical contacts extending from said first connector; and a second connector complementary to said first connector and having therein a recess for receiving said electrical contact extending from said first connector.

24. The connector assembly in accordance with claim 23, wherein:

said electrical contact extending from said first connector is disposed centrally of said first connector; and said first connector further comprises alignment structure for axial alignment of said first connector with said second connector.

25. The connector assembly in accordance with claim 23, wherein:

said electrical contact extending from said first connector is disposed at a point removed from the center of said first connector; and said electrical contact serves as alignment structure for angular positioning of said plurality of bodies in said connector in said transverse section about a nominal longitudinal axis of said bundle for registry of said first and second connectors.

26. A method for making a hybrid electrical and fiber-optic connector, said method comprising the steps of:

positioning a plurality of bodies of substantially cylindrical configuration and of equal diameter side-by-side, said plurality of bodies including at least one fiber-optic ferrule having extending centrally therethrough a single fiber-optic tube, and at least one electrical contact adapted to have fixed thereto an electrically conductive wire;

surrounding said bodies with a sleeve member operative to engage all peripheral ones of said plurality of bodies and to exercise a radially compressive force on said plurality of bodies to urge said plurality of bodies into a configuration in which said plurality of bodies are coparallel and nested so as to form a stable bundle which in transverse section is substantially axisymmetrical;

locking said plurality of bodies in position in said configuration; and affixing an alignment structure to said connector for angular positioning of said plurality of bodies in said connector in said transverse section about a nominal longitudinal axis of said bundle for registry of said connector with a second connector of complementary configuration.

27. The method in accordance with claim 26, and including the additional steps of:

inserting an optical fiber in each of said ferrule tubes;

fixing said optical fibers in said tubes;

removing portions of said fibers extending from a face portion of each of said ferrules; and fixing an electrically conductive wire to each of said contacts.

28. The method in accordance with claim 27, and including the further step of simultaneously polishing said face portions of said plurality of bodies for precision abutment with faces of bodies of said second connector.

29. The method in accordance with claim 28 wherein said electrical contacts are each provided with a central threaded recess extending from a face portion thereof, and including the further step of threadably fixing a contact pin in said recess.

* * * * *